(12) United States Patent
Harris

(10) Patent No.: US 6,240,950 B1
(45) Date of Patent: Jun. 5, 2001

(54) VAPOR CONTROL VALVE WITH BYPASS CIRCUIT

(75) Inventor: Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/384,521

(22) Filed: Aug. 27, 1999

Related U.S. Application Data
(60) Provisional application No. 60/098,066, filed on Aug. 27, 1998.

(51) Int. Cl.$^7$ .................................................. F16K 24/04
(52) U.S. Cl. ............................................. 137/202; 137/43
(58) Field of Search .............................. 137/43, 198, 202

(56) References Cited

U.S. PATENT DOCUMENTS

| | | | |
|---|---|---|---|
| 4,781,218 | * | 11/1988 | Mori et al. ............................. 137/202 |
| 4,938,254 | * | 7/1990 | Gimby ................................... 137/541 |
| 5,443,561 | * | 8/1995 | Sakata et al. ......................... 137/202 |
| 5,582,198 | * | 12/1996 | Nagino et al. .................... 137/202 X |
| 5,775,362 | * | 7/1998 | Sato et al. ............................. 137/202 |
| 5,954,082 | * | 9/1999 | Waldorf et al. ...................... 137/202 |

* cited by examiner

Primary Examiner—Gerald A. Michalsky
(74) Attorney, Agent, or Firm—Barnes & Thornburg

(57) ABSTRACT

A vapor control valve includes first, second, and third valves and a housing formed to include first, second, and third chambers and first, second, and third apertures. The first valve is formed to include a vent aperture and is movable relative to the first aperture to partially close the first aperture to limit flow from the first chamber to the second chamber through the first aperture. The second valve is movable relative to the first valve to open and close the vent aperture and cooperates with the first valve to close the first aperture to prohibit flow from the first chamber to the second chamber through the first aperture in response to rising liquid fuel. The third valve is biased to normally close the third aperture and configured to open the third aperture in response to pressurized fuel vapor to permit flow from the second chamber to the third chamber through the third aperture. The vapor control valve includes a blocker coupled to the second valve and configured to extend through the first aperture into the third chamber to contact the third valve to maintain closure of the third aperture by the third valve when the first aperture is closed by the first and second valves.

45 Claims, 8 Drawing Sheets ized so that a greater volume of fuel vapor can pass therethrough and be vented to the canister through the discharge outlet even though only a small volume of fuel vapor is being allowed to vent by the two-stage vent valve in response to certain pressure conditions in the tank.

VAPOR CONTROL VALVE WITH BYPASS CIRCUIT

This application claims priority under 35 U.S.C. § 119 (e) to U.S. Provisional Application Ser. No. 60/098,066, filed Aug. 27, 1998, which is expressly incorporated by reference herein.

BACKGROUND AND SUMMARY OF THE INVENTION

The present invention relates to vapor control valves for vehicle fuel tanks, and particularly to multi-stage vapor control valves. More particularly, the present invention relates to a tank-mounted valve that operates to vent pressurized fuel vapor from a vehicle fuel tank to a vapor recovery canister on board the vehicle.

Vapor control valves are used in fuel tanks to vent fuel vapors generated during refueling due to agitation of the dispensing fuel. In addition, the fuel vapors already present in the fuel tank are displaced by liquid fuel being dispensed into the fuel tank. As the pressure inside the tank increases, that pressure needs to be released. In vehicle tanks without vapor control valves, the pressurized vapor escapes into the atmosphere through a filler neck in the fuel tank. Vapor control valves act to exhaust these displaced vapors to a vapor recovery canister or other such destination outside the fuel tank.

According to the present invention, a vapor control valve assembly is mounted to a fuel tank and includes a housing with a vent inlet and a bypass inlet, both in communication with pressurized vapor in the fuel tank. The assembly further includes a discharge outlet which carries fuel vapor to a vapor-recovery canister and a vent passageway connecting the vent inlet to the discharge outlet. A bypass passageway connects the bypass inlet with a bypass outlet which is in communication with pressurized vapor in the vent passageway. A first closure means positioned in the vent inlet is moveable between opened and closed positions for closing in response to liquid fuel rising in the vent housing. A second closure means is positioned in the bypass outlet and is normally closed. However, the second closure means opens when pressure in the bypass passageway is greater than a predetermined pressure and when the first closure means is in its opened position.

In preferred embodiments, the valve assembly includes a housing mounted in an aperture formed in the top wall of the fuel tank and two valves for controlling the flow of pressurized fuel vapor through the housing from a vehicle fuel tank to a vapor-recovery canister onboard the vehicle. A vent passageway conducts fuel vapor from a vent inlet through the housing to a discharge outlet coupled to the canister and a two-stage vent valve (the first valve) in the tank regulates fuel vapor flow from the tank into the vent passageway.

A bypass passageway conducts fuel vapor from a bypass inlet through the housing to a bypass outlet coupled to the vent passageway and a bypass valve (the second valve) in the housing regulates fuel vapor flow into the vent passageway from the bypass passageway and the tank. The fuel vapor discharged from the bypass passageway through the bypass outlet mixes with fuel vapor passing through the vent passageway and the mixture is discharged from the housing to the canister through the discharge outlet.

The bypass valve is configured to open when the two-stage vent valve is partly opened and a small volume of fuel vapor is venting from the tank to the canister through the vent passageway in the housing. The bypass passageway is

BRIEF DESCRIPTION OF THE DRAWINGS

The detailed description particularly refers to the accompanying figures in which.

DETAILED DESCRIPTION OF THE DRAWINGS

Figure 1:
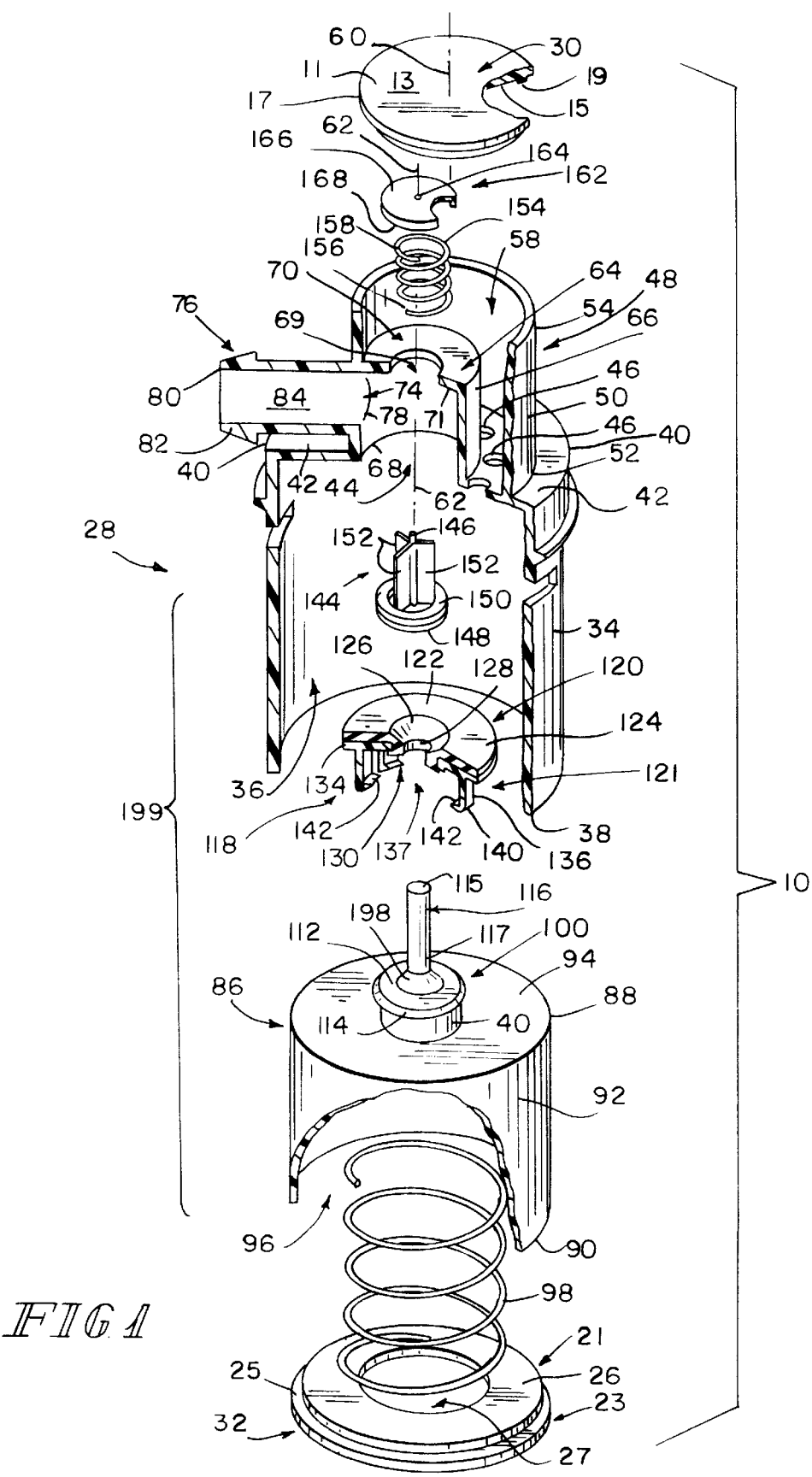
FIG. 1 is an exploded perspective view with portions broken away of a vapor control valve assembly including a floor, a valve container configured to engage the floor and to house valve and float members, primary and secondary closure shells mounted upon the valve container and housing, a bypass valve, an outlet extending from the primary closure shell, and a container lid coupled to the primary closure shell.

A vapor control valve or valve assembly 10 of the present invention is shown in FIG. 1 and includes a bypass circuit that allows fuel vapor within a fuel tank 14 to exit fuel tank 14 through the bypass circuit to a vapor recovery canister (not shown) when the vapor pressure is at an increased level within fuel tank 14. The bypass circuit works in such a way so that in instances wherein a two-stage valve 199 is in a partially opened position, increased vapor pressure within valve assembly 10 actuates a secondary, bypass valve 144 to an open position allowing the fuel vapor to escape. Bypass valve 144 is ordinarily biased to a closed position within valve assembly 10. Bypass valve 144 also operates in conjunction with a float valve or float member 86 of two-stage valve 199 so that if fuel tank 14 were to become inverted thereby allowing liquid fuel 16 to enter valve assembly 10, bypass valve 144 will remain in a closed position preventing liquid fuel 16 from exiting valve assembly 10 to the vapor recover canister or other destination outside the fuel tank.

Figure 2:
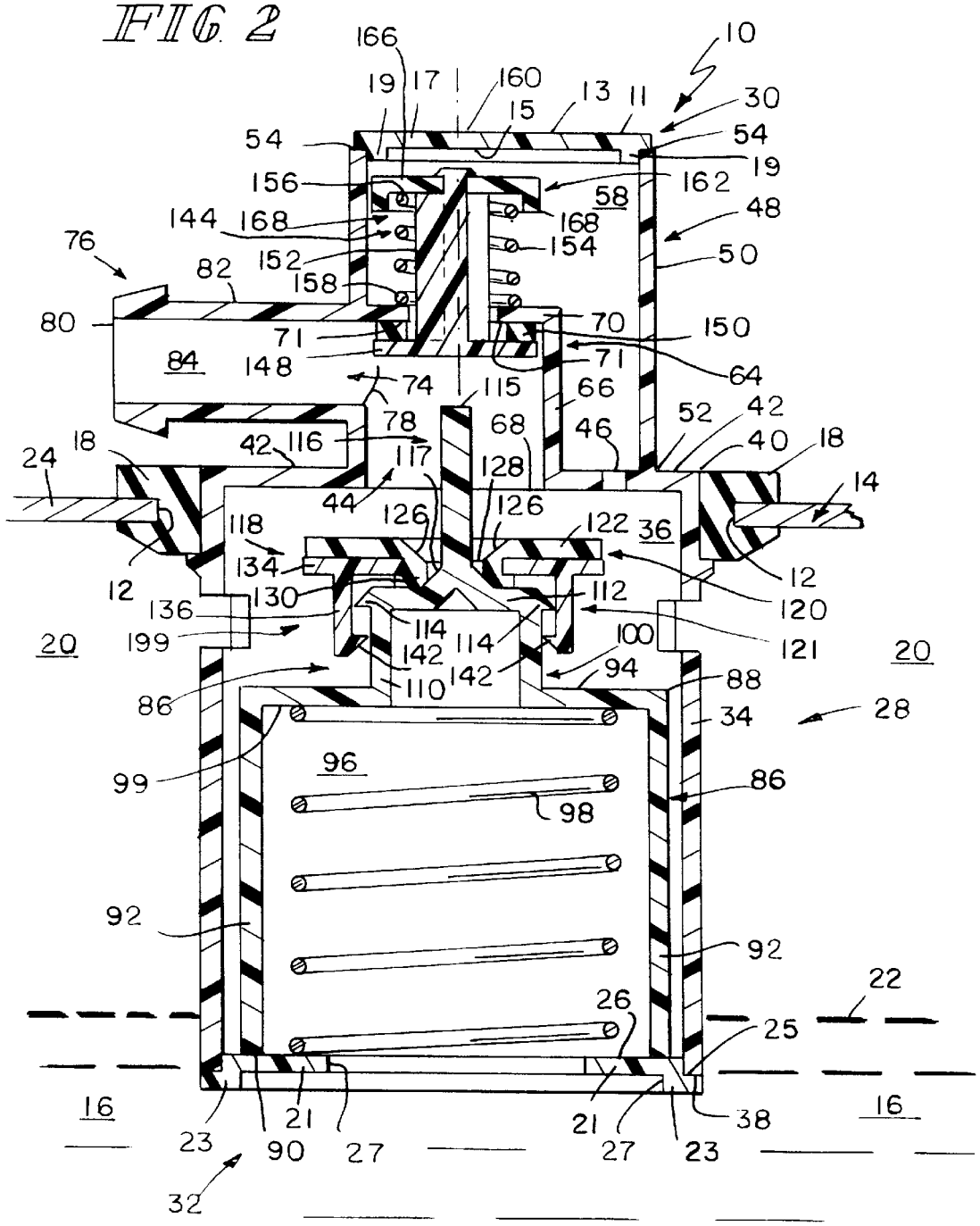
FIG. 2 is a cross-sectional view of the valve assembly of FIG. 1 when fuel present within a fuel tank is in an initial position enabling fuel vapor to flow through the valve container, secondary closure shell, and outlet and also wherein the float member is in a fully open position and the bypass valve is spring biased to a closed position against the secondary closure shell.

As shown in FIG. 2, valve assembly 10 is mounted in an aperture 12 formed in a fuel tank 14 to regulate flow of liquid fuel 16 and fuel vapor (not shown) from tank 14 to a vapor recovery canister (not shown) or other destination outside tank 14. Valve assembly 10 is coupled to tank 14 using an O-ring seal 18, although it is understood that valve assembly 10 can be welded in place to tank 14. Alternatively, a grommet (not shown) can also be used to establish a sealed connection between tank 14 and valve assembly 10. Tank 14 contains liquid fuel 16 that is introduced into tank 14 through a filler neck (not shown) using a conventional fuel-dispersing pump nozzle (not shown). A space 20 in tank 14 above a top surface 22 of liquid fuel 16 and below a top wall 24 of tank 14 is known as the "vapor space" and contains fuel vapor in tank 14. Valve assembly 10 operates to vent pressurized fuel vapor from vapor space 20 at the proper time and also operates to block unwanted discharge of liquid fuel 16 and fuel vapor from tank 14 through aperture 12 formed in top wall 24 of tank 14.

As shown in FIG. 1, valve assembly 10 includes a valve container or housing 28, a container lid 30, and a floor 32. Container lid 30 includes a disk 11 with a top surface 13, bottom surface 15, and a wall 17 extending therebetween. Container lid 30 also includes a rim 19 extending downwardly from bottom surface 15 of disk 11. Floor 32 includes first and second rings 21, 23 that cooperate to form aperture 27 therethrough where fuel 16 is able to enter valve container 28. Valve container 28 is configured to engage floor 32 and includes a cylindrical sleeve 34 defining a valve chamber 26 therein. Sleeve 34 has an annular lower rim 38 and an annular upper rim 40. Valve container 28 also includes a top wall 42 extending from upper rim 40. Top wall 42 is formed to include a venting outlet 44 therethrough and a plurality of bypass apertures 46 extending about a portion of top wall 42 extending about the circumference of venting outlet 44.

A primary closure shell 48 is mounted upon top wall 42 and includes a side wall 50 extending about bypass apertures 46 and venting outlet 44 on top wall 42. Side wall 50 includes a first end 52 mounted on top wall 45 and an opposite second end 54 formed to engage bottom surface 15 of lid 30. Sidewall 50 defines a cavity 58 that is fluidly connected to valve chamber 36 by bypass apertures 46. In addition, first end 52 of side wall 50 is positioned to lie on top wall 42 such that a central axis 60 running vertically through primary closure shell 48 is offset from a central axis 62 that runs through valve assembly 10.

A secondary closure shell 64 is positioned to lie within cavity 58 of primary closure shell 48. Secondary closure shell 64 includes a wall 66 with a first end 68 and an opposite second end 70. First end 68 extends about the periphery of venting outlet 44 of top wall 42. Second end 70 includes an aperture 69 fluidly connecting primary and secondary closure shells 48, 64. Wall 66 of secondary closure shell 64 is also formed to include an outlet 74 therein. As shown in FIG. 1, primary closure shell 48 and secondary closure shell 64 are positioned to lie relative to one another such that bypass apertures 46 are positioned to lie between wall 66 of secondary closure shell 64 and wall 50. An outlet tube 76 extends from outlet 74 and is formed to include a first end 78 in alignment with outlet 74, a second end 80 leading to a vapor recovery canister or other destination (not shown) outside tank 14, and a tubular wall 82 extending therebetween. Outlet tube 76 forms exhaust chamber 84 through which fuel vapors are able to flow before exiting second end 80 of tube 76.

As shown in FIG. 1, valve assembly 10 further includes float member 86 housed by valve container 28 and sized to axially move within valve chamber 36. Float member 86 includes a top 88, bottom 90, and a central tube portion 92 extending therebetween. Float member 86 also includes a top surface 94 that cooperates with central tube portion 92 to define a chamber 96. Chamber 96 is formed to house compression spring 98 therein. Compression spring 98 extends between an inside surface 99 on top surface 94 (see FIG. 2) of float member 86 and a top surface 26 of first ring 21 of floor 32. Spring 94 applies an axially upwardly directed force on float member 86 by acting against floor 32 and top surface 94 to assist in lifting float member 86 whenever float member 86 is exposed to rising levels of liquid fuel 16.

A nipple 100 is attached to top surface 94 of float member 86 and is formed to include a cylindrical wall 110 extending upwardly and axially from top surface 94. Attached to cylindrical wall 110 is an upper lid 112 larger than a diameter of cylindrical wall 110 thus forming an outer lip 114. This is best illustrate din cross-sectional views of assembly 10 shown in FIGS. 2–6. Extending axially from lid 112 is a nose or blocker 116. Nose 116 includes a top surface 115 and a bottom edge 117 engaging lid 112.

Valve assembly 10 also includes a valve member 118 positioned to lie within valve container 28. Valve member 118 comprises a top portion 120 coupled to a bottom portion 121. Top portion 120 includes an annular ring 112 having another surface 124 and an inner conical surface 126 defining an aperture 128. Top portion 120 of valve member 118 also includes tap 130 extending outwardly from inner surface 126. Bottom portion 121 includes a lower ring 134 with bottom surface 138 and inner rim 132 formed to couple tab 130 of top portion 120 of valve member 118. Bottom portion 121 also includes a sleeve 136 extending down from lower ring 134, thereby forming a cavity 137. Formed at a lower end 140 of cylinder 136 is an inward lip 142 engageable with lip 114 of nipple 100. As shown in FIGS. 2–6, nose 116 is sized to extend through aperture 128 and lip 114 of nipple 100 is formed to lie within cavity 137.

With nose 116 positioned entirely through aperture 128 a conical portion 198 at the bottom edge 117 of nose 116 seals against aperture 128. Float member 86 and valve member 118 generally make up two-stage valve 199. A further description of the operation of float member 86 and valve member 118 is found in U.S. Pat. No. 5,028,244 to Szlaga, the specification of which is incorporated herein by reference.

Bypass valve 144 is formed to extend through aperture 69 and to be housed within both primary and secondary closure shells 48, 64. Bypass valve 144 includes a base 148 and a stem portion 146 coupled to base 148. A sealing ring 150 extends about base 148. Three guide flanges 152 are formed to extend outward radially from step 146. A cap 162 formed to include a top plate 166 and a rim 168 extends downwardly from top plate 164. Cap 162 also includes an aperture 164 formed for receiving stem 146 of bypass valve 144. A compression spring 154 extends about guide flanges 152 and rests with one end 156 on second end 70 of secondary closure 64 (see FIGS. 2–6) and with another end 158 pressing against an inside surface 160 of cap 162.

In operation, spring 154 normally biases bypass valve 144 in a closed position, as shown in FIG. 2, against an inside surface 71 of second end 70 of secondary closure shell 64 thereby preventing vapor flow from cavity 58 through aperture 69 to secondary closure shell 64. In addition, FIG. 2 shows float member 86 in a fully opened or lowered position due to the low level of liquid fuel 16 in fuel tank 14. Thus, valve member 118 is shown in a fully open position. This low initial position of fuel 16 enables fuel vapor to flow through valve chamber 36 to venting outlet 44 and into secondary closure shell 64. Once in secondary closure shell 64, vapors can move through outlet 74 into outlet tube 76 and finally escape through second end 80 of tube 76. From here, the fuel vapors flow to a vapor recovery canister or other destination (not shown) outside tank 14.

Figure 3:
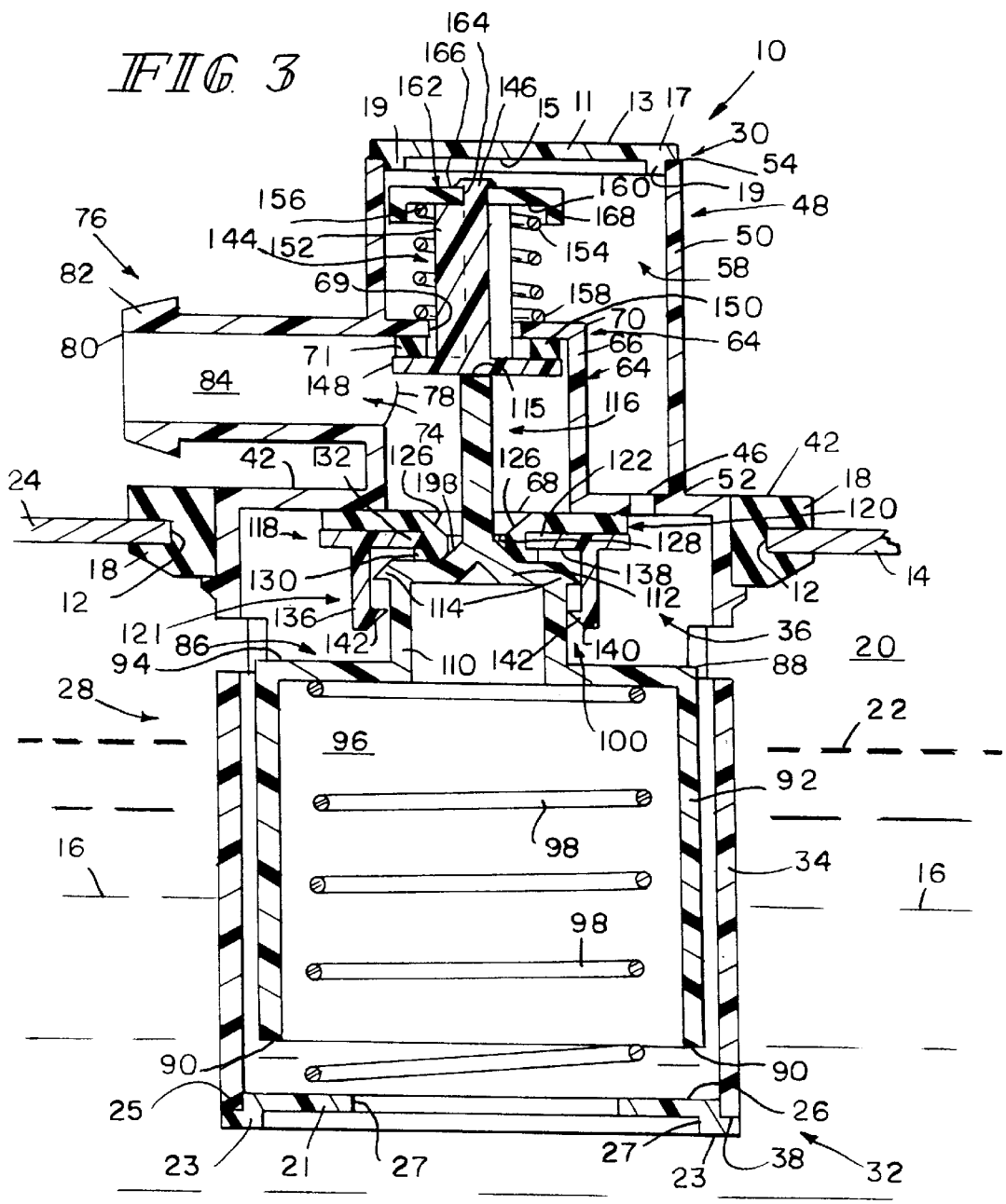
FIG. 3 is a view similar to FIG. 2 after the fuel present within the fuel tank has risen to an elevated position causing float member to float upon the fuel and rise to press a valve member to a fully closed position and wherein a nose coupled to the float member engages the bypass valve in the secondary closure shell.
Figure 4:
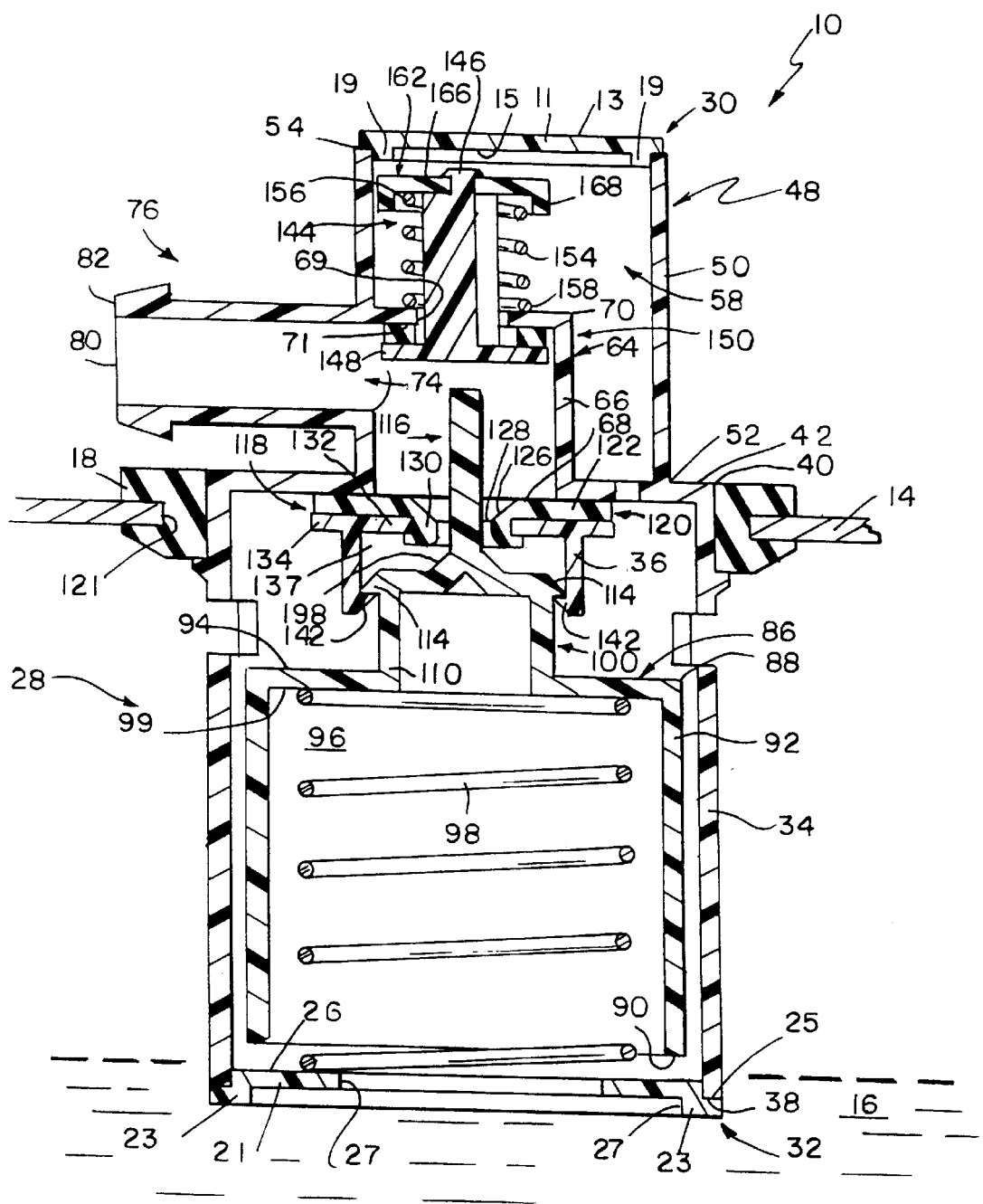
FIG. 4 is a view similar to FIG. 3 after fuel present within the fuel tank has receded to a lowered position causing the float member to drop toward the floor of the valve assembly while the valve member remains engaged with the valve container due to the increased fuel vapor pressure in the fuel tank and the bypass valve remains spring biased in the closed position.
Figure 5:
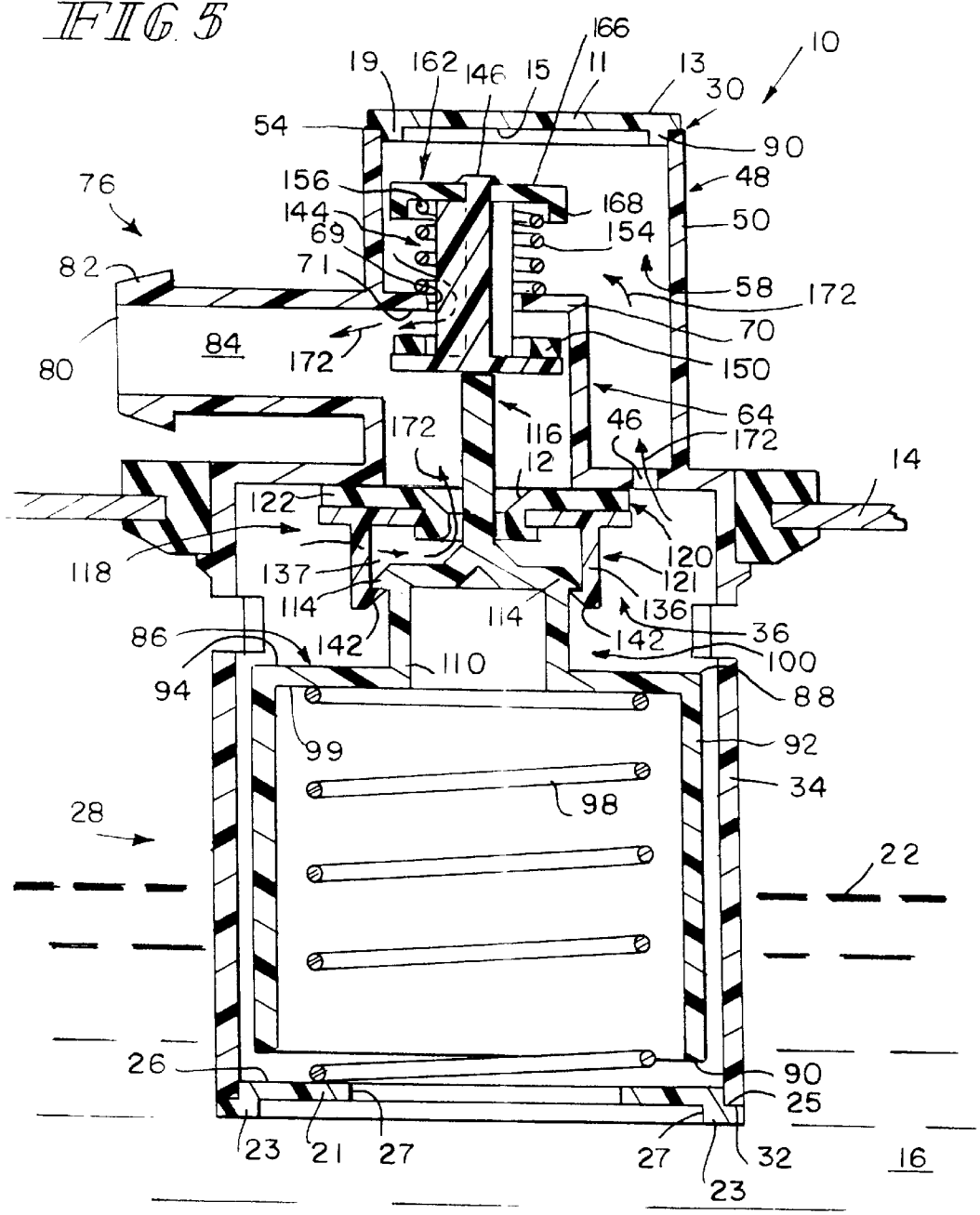
FIG. 5 is a view similar to FIG. 4 showing fuel vapor pressure building within the fuel tank causing the fuel vapor to vent into the primary closure shell through bypass apertures urging the bypass valve to an open position and showing the fuel vapor venting from the primary closure shell into the secondary closure shell where the fuel vapor exists the outlet.

Referring now to FIG. 3, as liquid fuel 16 rises to an elevated position within tank 14, fuel 16 flows into chamber 36 through floor aperture 27 thereby causing float member 86 to float upon fuel 16 and rise upwardly within valve container 28. In FIG. 3, float member 86 has risen to a fully closed position. Nose 116 extends through aperture 128 so that top surface 115 of nose 116 engages base 148 of bypass valve 144. Here, nose 116 of nipple 100 acts in conjunction with spring 154 to keep bypass valve 144 in its closed position and thereby prevent vapor flow through aperture 69 of secondary closure shell 64. Valve member 118, carried by float member 86, has also subsequently risen to close venting outlet 44 fluidly connecting chamber 36 of valve container 28 with secondary closure shell 64. Annular ring 122 of top portion 120 of valve member 118 now lies in contact with top wall 42 of valve container 28. Thus, valve assembly 10 is closed to prevent discharge of agitated liquid fuel 16 from tank 14 or block over fueling of tank 14.

Valve assembly 10 is also configured to open automatically after agitation of liquid fuel 16 in tank 14 has subsided or refueling has been completed causing the fuel level in tank 14 to fall. After fuel 16 present within fuel tank 14 has receded to a lowered position, (see FIG. 4) the central tube portion 92 of float member 86 drops back toward floor 32. Nose 116 travels back down through aperture 128 of valve member 118. At this time, however, valve member 118 remains in a closed position wherein annular ring 122 engages top wall 42 of valve assembly 28. Float member 86 is suspended by valve member 118 wherein outer lip 114 of nipple 100 is shown to engage inward lip 142 of bottom portion 136 of valve member 118. Valve member 118 will remain in its closed position until fuel vapor pressure is allowed to drop further in fuel tank 20. Bypass valve 144 remains spring biased by spring 154 in the closed position.

Sometimes, conditions in fuel tank 14 will cause fuel vapor pressure to rise, when valve member 118 is closed, but the entire two-stage valve 199 is partially opened, thus preventing valve member 118 to drop away from top wall 42 of valve assembly 10. In this instance, some fuel vapor is allowed to slowly bleed through the partially opened two-stage valve 199. However, such bleeding is not enough to relieve the pressure which may build up on the tank under certain conditions. Therefore, when fuel vapor pressure within fuel tank 20 reaches a pre-determined level, bypass valve 144 opens and vapor vents through aperture 69 as shown by arrows 172 in FIG. 5. Specifically, the fuel vapor travels from valve chamber 36 of valve assembly 28 up through bypass apertures 46 into cavity 58 of primary closure shell 48. As the vapor pressure builds within primary closure shell 48, the increased pressure acts against base 148 and yieldably biases bypass valve 144 downward through aperture 69 into secondary closure shell 64. At this point, sealing ring 150 is spaced apart from second end 70 of secondary closure shell 64. Thus, fuel vapor exists cavity 58 of primary closure shell 48 through aperture 69, and flows into exhaust chamber 84 via secondary closure shell 64. Also, fuel vapor within valve assembly 28 is released through aperture 128 in valve member 118 into secondary closure shell 64 where it can travel out outlet tube 76.

Figure 6:
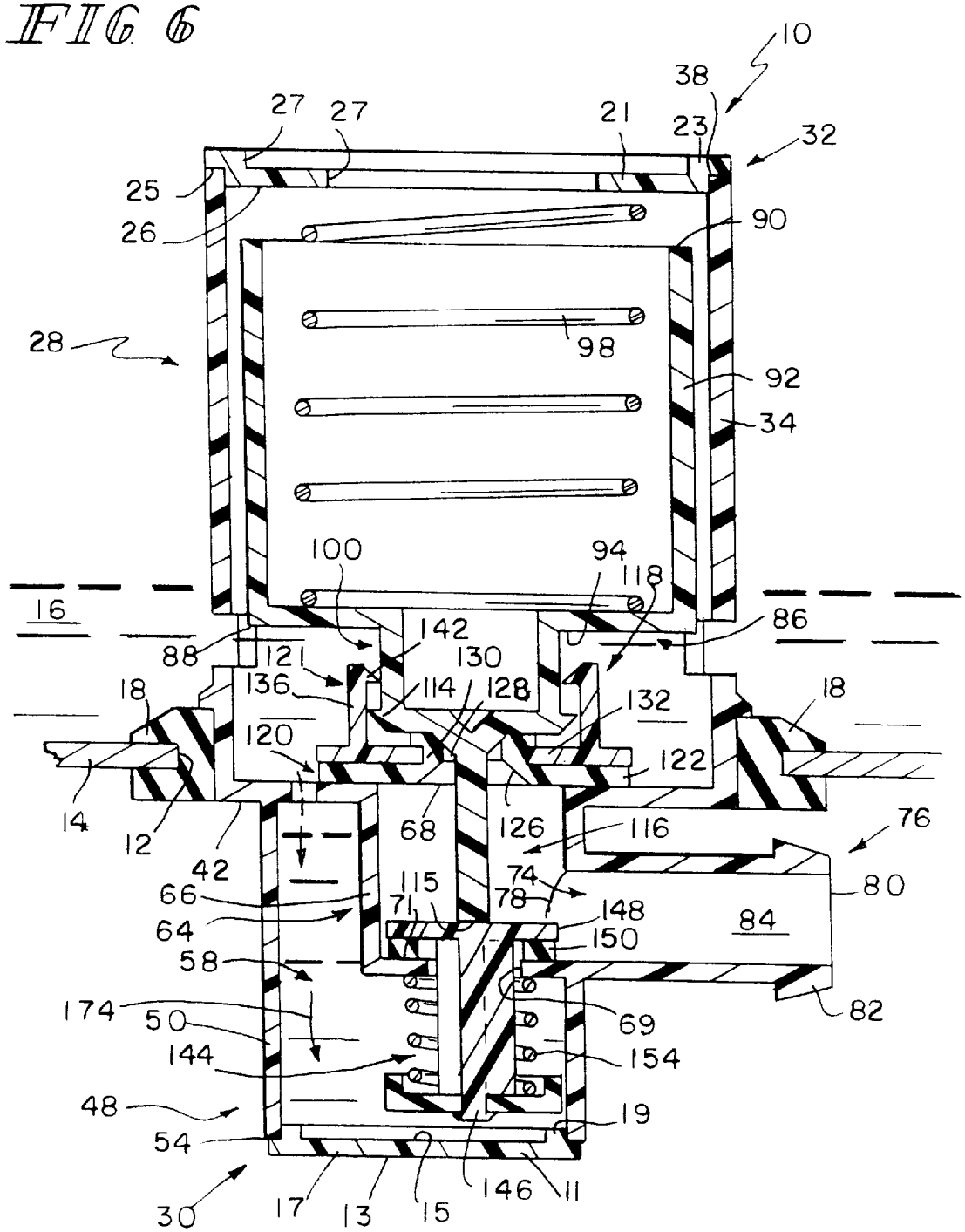
FIG. 6 is a sectional view of the valve assembly similar to FIG. 2 when the fuel tank is in an inverted position causing the float member to drop to the fully closed position so that the nose of the float member engages the bypass valve thereby cooperating with a spring of the bypass valve to retain the bypass valve in the fully closed position, thus preventing liquid fuel from flowing from the valve container and primary closure shell into the secondary closure shell and through the outlet.

In instances where fuel tank 14 becomes inverted, as shown in FIG. 6, float member 86 drops to the fully closed position so that top surface 115 of nose 116 engages base 148 of bypass valve 144. Here, nose 116 acts in conjunction with compression spring 154 to hold bypass valve 144 in the closed position. Sealing ring 150 of bypass valve 144 and inside surface 71 of secondary closure shell 64 cooperate so that as fuel tank 14 with valve assembly 10 becomes inverted and liquid fuel 16 enters valve assembly 10 through aperture 27 in floor 32, fuel 16 is held within chamber 36 and cavity 58. Liquid fuel 16 freely travels from valve chamber 36 of valve container 28 to cavity 58 of primary closure shell 48 through bypass apertures 46 shown by arrows 174. Liquid fuel 16 is, however, prevented from entering secondary closure shell 64 through aperture 69 because bypass valve 144 remains in the closed position. As fuel tank 14 becomes inverted, float member 86 also carries valve member 118 to the fully closed position thus blocking fuel from entering secondary closure shell 64 through venting outlet 44.

Figure 7:
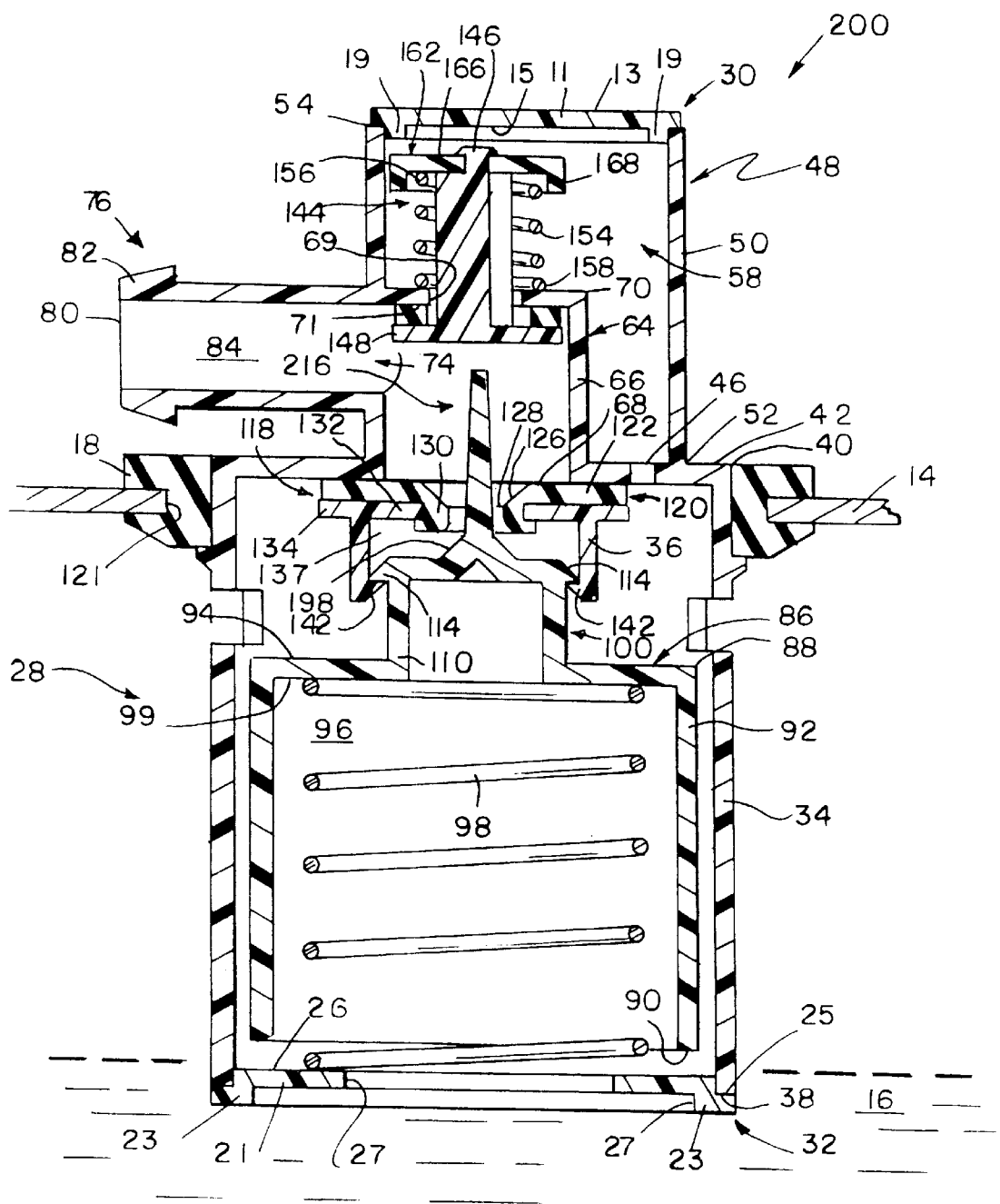
FIG. 7 is a view similar to FIG. 4 of an alternative embodiment of a vapor control valve assembly; illustrating the valve assembly after fuel present within the fuel tank has receded to a lowered position and showing the nose of the float member being tapered.
Figure 8:
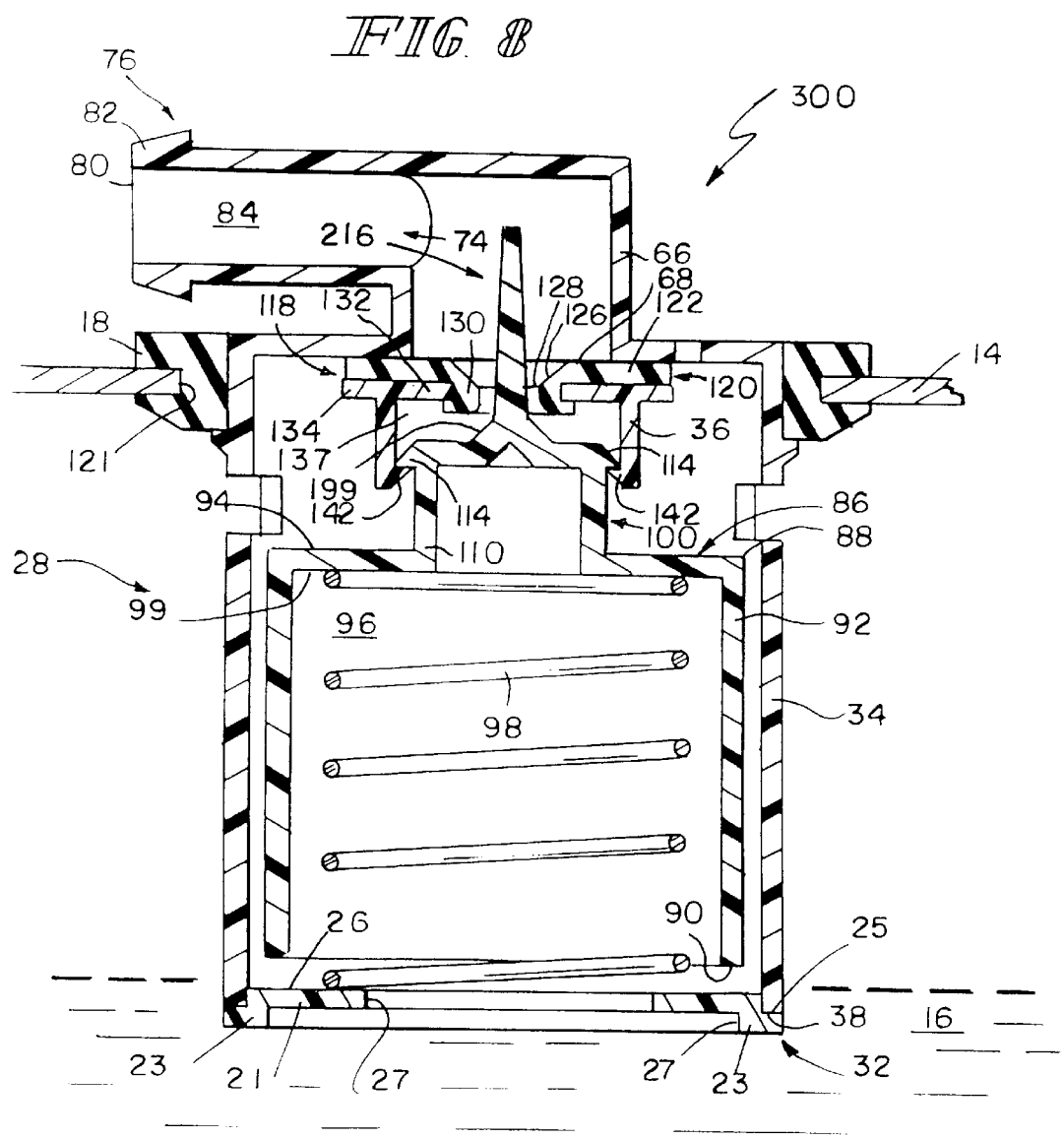
FIG. 8 is a view similar to FIG. 7 of yet another alternative embodiment of a vapor control valve assembly illustrating the tapered nose as part of the two-stage valve and without a bypass valve.

FIG. 7 illustrates another embodiment of a vapor control valve assembly 200. All parts of valve assembly 200 which are identical to the corresponding parts of valve assembly 10 are indicated using the same reference numerals as are used in reference to valve assembly 10. As shown in FIG. 7, however, a tapered nose 216 may be utilized instead of nose 116. Nose 216 is tapered to adjust the amount of flow permitted through aperture 128 as nose 216 slideably moves through aperture 128. FIG. 8 illustrates yet another embodiment of a vapor control valve assembly 300, wherein tapered nose 216 is utilized in two-stage valve 199 without the presence of bypass valve 144.

A valve assembly for fuel tanks is provided for controlling pressure within fuel tanks as the liquid fuel within the fuel tank is caused to rise and then drop again. The valve assembly contains a buoyant member for detecting and responding to the liquid level within the fuel tank and to the presence of liquid disturbances within the fuel tank to cause valve closure and thereby prevent the passage of liquid through the valves. With the two-stage valve in its fully closed position, the bypass valve will also be in its closed position thereby preventing any flow through the valve assembly. Further, when the two-stage valve is in its partially opened position, and excess pressure causes the bypass valve to open, the bypass valve will act against the stem of the two-stage valve to aid in moving the two-stage valve to its opened position. Finally, the present invention and arrangement of valves prevents liquid fuel from escaping the fuel tank in instances where the fuel tank becomes inverted.

Although the invention has been described in detail, variations and modifications exist within the scope and spirit of the invention as described.

What is claimed is:

1. A vapor control valve assembly mounted to a fuel tank comprising:

a valve housing including a vent inlet and a bypass inlet, the vent inlet and bypass inlet in communication with pressurized vapor in the fuel tank, a discharge outlet, a vent passageway connecting the vent inlet to the discharge outlet, a bypass outlet in communication with pressurized vapor in the vent passageway, a bypass passageway connecting the bypass inlet with the bypass outlet, first closure means positioned to lie in the vent inlet moveable between opened and closed positions for closing in response to liquid fuel rising in the valve housing, and second closure means positioned to lie in the bypass outlet for normally closing the bypass passageway, the second closure means opening in response to pressure in the bypass passageway having a magnitude greater than a pre-determined pressure and while the first closure means is in its opened position, the first closure means and the second closure means being positioned to lie in coaxial relation to one another.

2. A vapor control valve assembly comprising:

a valve sleeve defining a valve chamber, a secondary closure shell coupled to the valve sleeve and defining an exhaust chamber, a primary closure shell coupled to the valve sleeve and surrounding the secondary closure shell, a bypass cavity formed between the primary closure shell and the secondary closure shell, a primary aperture formed within the valve sleeve and permitting fluid communication between the valve chamber and the exhaust chamber, a secondary aperture formed within the secondary closure shell and permitting fluid communication between the exhaust chamber and the bypass cavity, a wall formed as part of the valve sleeve and extending between the primary closure shell and the secondary closure shell and separating the valve chamber from the bypass cavity, the wall including a bypass aperture permitting fluid communication between the valve chamber and the bypass cavity, a two-stage valve positioned within the valve chamber and formed to slide axially within the valve chamber, the valve including a valve body, a nipple, and a stem having a distal tip positioned to extend through the primary aperture and into the exhaust chamber, the valve further including a seal disc positioned between the valve body and the distal tip and having a center orifice adapted to permit the stem to slidably extend therethrough, the two-stage valve being moveable between closed, partially opened, and fully opened positions, and wherein in its fully opened position the seal disc lies in a spaced apart relationship with the primary aperture permitting fuel vapor to flow therethrough, in its partially opened position the seal disc contacts the primary aperture thereby sealing it and the nipple lies in a spaced apart relationship with the center orifice permitting fuel vapor to flow therethrough, and in its closed position the nipple seals the center orifice and the seal disc seals the primary aperture thereby preventing fuel vapor to flow from the valve chamber to the exhaust chamber, a bypass valve positioned through the secondary aperture and moveable between opened and closed positions and wherein in its opened position the bypass valve permits fuel vapor to flow from the bypass cavity to the valve chamber, wherein the seal disc includes an inward lip, the nipple includes an outward lip which communicates with the inward lip of the seal disc to limit slidable movement of the seal disc relative to the stem, and the distal tip of the stem engages the bypass valve to prevent the bypass valve from opening when the two-stage valve is in its closed position.

3. A vapor control valve assembly comprising:

a valve sleeve defining a valve chamber, a secondary closure shell coupled to the valve sleeve and defining an exhaust chamber, a primary closure shell coupled to the valve sleeve and surrounding the secondary closure shell, a bypass cavity formed between the primary closure shell and the secondary closure shell, a primary aperture formed within the valve sleeve and permitting fluid communication between the valve chamber and the exhaust chamber, a secondary aperture formed within the secondary closure shell and permitting fluid communication between the exhaust chamber and the bypass cavity, a wall formed as part of the valve sleeve and extending between the primary closure shell and the secondary closure shell and separating the valve chamber from the bypass cavity, the wall including a bypass aperture permitting fluid communication between the valve chamber and the bypass cavity, a two-stage valve positioned within the valve chamber and formed to slide axially within the valve chamber, the valve including a valve body, a nipple, and a stem having a distal tip positioned to extend through the primary aperture and into the exhaust chamber, the valve further including a seal disc positioned between the valve body and the distal tip and having a center orifice adapted to permit the stem to slidably extend therethrough, the two-stage valve being moveable between closed, partially opened, and fully opened positions, and wherein in its fully opened position the seal disc lies in a spaced apart relationship with the primary aperture permitting fuel vapor to flow therethrough, in its partially opened position the seal disc contacts the primary aperture thereby sealing it and the nipple lies in a spaced apart relationship with the center orifice permitting fuel vapor to flow therethrough, and in its closed position the nipple seals the center orifice and the seal disc seals the primary aperture thereby preventing fuel vapor to flow from the valve chamber to the exhaust chamber, a bypass valve positioned through the secondary aperture and movable between opened and closed positions and wherein in its opened position the bypass valve permits fuel vapor to flow from the bypass cavity to the valve chamber, and wherein the distal tip of the stem engages the bypass valve to prevent the bypass valve from opening when the two-stage valve is in its closed position.

4. A vapor control valve assembly coupled to a fuel tank comprising:
- a valve housing including a valve seat and a housing chamber having a vent passageway and a bypass passageway, the housing chamber being in communication with pressurized vapor in the fuel tank, the valve seat being positioned to lie in the vent passageway,
- a multi-stage valve positioned in the vent passageway, the multi-stage valve being moveable between opened and closed positions, the multi-stage valve being moveable from the opened position toward the closed position by liquid fuel rising in the fuel tank, and
- a second valve positioned in the bypass passageway and the vent passageway, the second valve being moveable between an opened position to permit flow from the bypass passageway to the vent passageway and a normally closed position to prohibit flow from the bypass passageway to the vent passageway, the second valve including a resilient member positioned in the bypass passageway to bias the second valve to the normally closed position, the second valve being moveable from the closed position toward the opened position by pressure in the fuel tank having a magnitude greater than a pre-determined pressure, the second valve being configured to engage the valve seat in the vent passageway.

5. A vapor control valve assembly coupled to a fuel tank comprising:
- a valve housing including a vent passageway and a bypass passageway, the vent passageway and bypass passageway being in communication with pressurized vapor in the fuel tank,
- a first valve positioned in the vent passageway, the first valve being moveable between opened and closed positions, the first valve being moveable from the opened position toward the closed position by liquid fuel rising in the fuel tank, and
- a second valve positioned in the bypass passageway, the second valve being moveable between opened and closed positions, the second valve being moveable from the closed position toward the opened position by pressure in the fuel tank having a magnitude greater than a pre-determined pressure, the first valve including a blocker positioned to abut the second valve to prevent the second valve from opening when the first valve is in its closed position and spaced apart from the second valve to permit the second valve to open when the first valve is in its opened position.

6. The vapor control valve assembly of claim 5, wherein the first valve includes a first member and a second member, the first member is formed to include a vent aperture and is movable relative to the valve housing between a restriction position to restrict the vent passageway and an opened position, the second member includes the blocker and is movable relative to the first member between a closed position to close the vent aperture and an opened position to permit flow through the vent aperture.

7. The vapor control valve assembly of claim 6, wherein the blocker is positioned to lie below the second valve and extends through the vent aperture to abut the second valve when the second member is in its closed position.

8. The vapor control valve assembly of claim 6, wherein the valve housing includes a wall formed to include a wall aperture extending from the bypass passageway to the vent passageway, the second valve extends through the wall aperture and includes a closure portion positioned to lie in the vent passageway and a spring positioned to lie in the bypass passageway.

9. The vapor control valve assembly of claim 8, wherein the closure portion is spaced apart from the wall when the first member is in its restriction position, the second member is in its opened position to open the vent aperture, and fuel vapor is pressurized to a predetermined level to permit fuel vapor to discharge from the bypass passageway into the vent passageway through the wall aperture.

10. The vapor control valve assembly of claim 5, wherein the valve housing includes a wall formed to include a wall aperture extending from the bypass passageway to the vent passageway, the second valve includes a spring positioned to lie in the bypass passageway and a closure portion spaced apart from the spring and positioned to lie in the vent passageway, and the closure portion is movable between a normally closed position in which the closure portion blocks fuel vapor from flowing through the wall aperture and an opened position in which the closure portion permits fuel vapor to flow through the wall aperture.

11. The vapor control valve assembly of claim 10, wherein the spring biases the closure portion to the normally closed position, the closure portion abuts the wall in the normally closed position, and the closure portion is spaced apart from the wall in the opened position.

12. The vapor control valve assembly of claim 11, wherein the wall is horizontal and is positioned to lie between the spring and the closure portion, and the closure portion is positioned to lie below the spring.

13. The vapor control valve assembly of claim 12, wherein the second valve includes a stem and guide flanges extending radially outwardly from the stem, the stem includes a first end coupled to the closure portion and a second end spaced apart from the first end, and the stem and the guide flanges extend through the wall aperture.

14. The vapor control valve assembly of claim 13, wherein the second valve includes a cap positioned to lie in the bypass passageway and formed to include a cap aperture, the second end of the stem is positioned to lie in the cap aperture, and the spring abuts the wall and the cap.

15. The vapor control valve assembly of claim 5, wherein the blocker is coaxial with the second valve.

16. The vapor control valve assembly of claim 5, wherein the blocker is positioned to lie directly below the second valve.

17. The vapor control valve assembly of claim 5, wherein the blocker includes a first end and a second end and the blocker is tapered from the first end to the second end.

18. A fuel vapor recovery system comprising
- a housing formed to include a first chamber adapted to communicate with a fuel tank, a second chamber adapted to communicate with a fuel vapor recovery canister, a first aperture, and a second aperture, the first and second apertures being in communication with the first and second chambers,
- a first valve movable relative to the first aperture to a limited flow position to limit flow from the first chamber through the first aperture to the second chamber,
- a second valve movable relative to the first valve to an opened position to permit flow from the first chamber through the first aperture to the second chamber when the first valve is in the limited flow position and to a closed position to prohibit flow from the first chamber through the first aperture to the second chamber when the first valve is in the limited flow position, and
- a third valve biased to normally close the second aperture to prohibit flow from the first chamber through the second aperture to the second chamber and configured to open the second aperture to permit fuel vapor to flow from the first chamber through the second aperture to the second chamber for discharge into the fuel vapor recovery canister when the first valve is in the limited flow position and the second valve is in the opened position, the second and third valves being positioned to lie in coaxial relation to one another.

19. The fuel vapor recovery system of claim 18, wherein the first valve is positioned to lie in coaxial relation to the second and third valves.

20. A fuel vapor recovery system comprising a housing formed to include a first chamber adapted to communicate with a fuel tank, a second chamber adapted to communicate with a fuel vapor recovery canister, a first aperture, and a second aperture, the first and second apertures being in communication with the first and second chambers, a first valve movable relative to the first aperture to a limited flow position to limit flow from the first chamber through the first aperture to the second chamber, a second valve movable relative to the first valve to an opened position to permit flow from the first chamber through the first aperture to the second chamber when the first valve is in the limited flow position and to a closed position to prohibit flow from the first chamber through the first aperture to the second chamber when the first valve is in the limited flow position, and a third valve biased to normally close the second aperture to prohibit flow from the first chamber through the second aperture to the second chamber and configured to open the second aperture to permit fuel vapor to flow from the first chamber through the second aperture to the second chamber for discharge into the fuel vapor recovery canister when the first valve is in the limited flow position and the second valve is in the opened position, the first and second apertures and the third valve being positioned to lie in coaxial relation to one another.

21. A fuel vapor recovery system comprising a housing formed to include a first chamber adapted to communicate with a fuel tank, a second chamber adapted to communicate with a fuel vapor recovery canister, a first aperture, and a second aperture, the first and second apertures being in communication with the first and second chambers, a first valve movable relative to the first aperture to a limited flow position to limit flow from the first chamber through the first aperture to the second chamber, a second valve movable relative to the first valve to an opened position to permit flow from the first chamber through the first aperture to the second chamber when the first valve is in the limited flow position and to a closed position to prohibit flow from the first chamber through the first aperture to the second chamber when the first valve is in the limited flow position, and a third valve biased to normally close the second aperture to prohibit flow from the first chamber through the second aperture to the second chamber and configured to open the second aperture to permit fuel vapor to flow from the first chamber through the second aperture to the second chamber for discharge into the fuel vapor recovery canister when the first valve is in the limited flow position and the second valve is in the opened position, and a blocker coupled to the second valve, the blocker being positioned to abut the third valve when the second valve is in its closed position, the blocker being positioned to lie in spaced apart relation to the third valve when the second valve is in its opened position.

22. The fuel vapor recovery system of claim 21, wherein the first valve is formed to include a vent aperture and the blocker extends through the vent aperture into the second chamber to abut the third valve.

23. A fuel tank vent system comprising a first conductor configured to provide a vent passageway, a second conductor configured to provide a bypass passageway and coupled to the first conductor, a first valve movable to a restriction position to restrict flow of fuel vapor from a fuel tank to a canister through the vent passageway of the first conductor, the first valve being formed to include a vent aperture, a second valve movable to a closed position to close the vent aperture formed in the first valve and to an opened position to open the vent aperture formed din the first valve, means for communicating pressurized fuel vapor from the fuel tank to the vent passageway of the first conductor through the bypass passageway of the second conductor when the first valve is in its restriction position and the second valve is in its opened position so that fuel vapor is discharged from the fuel tank through the vent aperture formed in the first valve and the bypass passageway of the second conductor, and means for prohibiting flow through the bypass passageway to the vent passageway when the first valve is in its restriction position and the second valve is in its closed position.

24. The fuel tank vent system of claim 23, wherein the first and second conductors cooperate to form a wall formed to include a wall aperture extending from the bypass passageway to the vent passageway, the communicating means includes a third valve extending through the wall aperture and movable between a normally closed position in which the third valve blocks fuel vapor from flowing through the wall aperture and an opened position in which the third valve permits fuel vapor to flow through the wall aperture.

25. The fuel tank vent system of claim 24, wherein the third valve includes a spring positioned to lie in the bypass passageway and a closure portion spaced apart from the spring and positioned to lie in the vent passageway, the spring biases the closure portion to the normally closed position in which the closure portion abuts the wall to close the wall aperture, and the closure portion is spaced apart from the wall in the opened position to open the wall aperture.

26. The fuel tank vent system of claim 25, wherein the wall is horizontal and is positioned to lie between the spring and the closure portion, and the closure portion is positioned to lie below the spring.

27. The fuel tank vent system of claim 25, wherein the closure portion is spaced apart from the wall to open the wall aperture when the first valve is in its restriction position, the second valve is in its opened position to open the vent aperture, and fuel vapor is pressurized to a level so that fuel vapor discharges from the bypass passageway through the wall aperture to the vent passageway.

28. The fuel tank vent system of claim 25, wherein the third valve includes a stem and guide flanges extending radially outwardly from the stem, the stem includes a first end coupled to the closure portion and a second end spaced apart from the first end, and the stem and the guide flanges extend through the wall aperture.

29. The fuel tank vent system of claim 28, wherein the third valve includes a cap positioned to lie in the bypass passageway and formed to include a cap aperture, and the second end of the stem is positioned to lie in the cap aperture.

30. The fuel tank vent system of claim 28, wherein the spring includes a first end abutting the wall and a second end abutting the cap.

31. The fuel tank vent system of claim 24, wherein the prohibiting means is coupled to and movable with the second valve and is positioned to extend through the vent aperture.

32. The fuel tank vent system of claim 31, wherein the prohibiting means abuts the third valve when the first valve is in its restriction position and the second valve is in its closed position to maintain the third valve in its normally closed position to prohibit flow from the bypass passageway to the vent passageway.

33. The fuel tank vent system of claim 31, wherein the prohibiting means is positioned to lie in coaxial relation to the third valve.

34. The fuel tank vent system of claim 23, wherein the communicating means is positioned to lie in coaxial relation to the second valve.

35. A fuel vapor recovery system comprising
   a housing formed to include a first chamber, a second chamber, a third chamber, a first aperture in communication with the first chamber and the third chamber, a second aperture in communication with the first chamber and the second chamber, and a third aperture in communication with the second chamber and the third chamber,
   a first valve formed to include a vent aperture and movable in the first chamber to restrict flow through the first aperture,
   a second valve movable in the first chamber relative to the first valve to open the vent aperture to permit flow through the vent aperture and to close the vent aperture to prohibit flow through the vent aperture and the first aperture when the first valve is positioned to restrict flow through the first aperture, and
   a third valve movable through the third aperture in the second and third chambers to permit fuel vapor to flow from the second chamber to the third chamber through the third aperture when the first valve is positioned to restrict flow through the first aperture and the second valve is positioned to open the vent aperture, the second and third valves being positioned to lie on a common axis.

36. The fuel vapor recovery system of claim 35, wherein the first valve is positioned to lie on the common axis.

37. The fuel vapor recovery system of claim 36, wherein each of the first, second, and third valves are movable along the common axis.

38. The fuel vapor recovery system of claim 36, wherein each of the first and third apertures is positioned to lie on the common axis.

39. The fuel vapor recovery system of claim 35, wherein at least a portion of the first chamber is positioned to lie below the third chamber and at least a portion of the second chamber is positioned to lie above the third chamber.

40. A fuel vapor recovery system comprising
   a housing formed to include a first chamber, a second chamber, a third chamber, a first aperture in communication with the first chamber and the third chamber, a second aperture in communication with the first chamber and the second chamber, and a third aperture in communication with the second chamber and the third chamber,
   a first valve formed to include a vent aperture and movable in the first chamber to restrict flow through the first aperture,
   a second valve movable in the first chamber relative to the first valve to open the vent aperture to permit flow through the vent aperture and to close the vent aperture to prohibit flow through the vent aperture and the first aperture when the first valve is positioned to restrict flow through the first aperture, and
   a third valve movable through the third aperture in the second and third chambers to permit fuel vapor to flow from the second chamber to the third chamber through the third aperture when the first valve is positioned to restrict flow through the first aperture and the second valve is positioned to open the vent aperture, the first aperture, the third aperture, and at least one of the second valve and the third valve being positioned to lie on a common axis.

41. A fuel vapor recovery system comprising
   a housing formed to include a first chamber, a second chamber, a third chamber, a first aperture in communication with the first chamber and the third chamber, a second aperture in communication with the first chamber and the second chamber, and a third aperture in communication with the second chamber and the third chamber,
   a first valve formed to include a vent aperture and movable in the first chamber to restrict flow through the first aperture,
   a second valve movable in the first chamber relative to the first valve to open the vent aperture to permit flow through the vent aperture and to close the vent aperture to prohibit flow through the vent aperture and the first aperture when the first valve is positioned to restrict flow through the first aperture,
   a third valve movable through the third aperture in the second and third chambers to permit fuel vapor to flow from the second chamber to the third chamber through the third aperture when the first valve is positioned to restrict flow through the first aperture and the second valve is positioned to open the vent aperture, and
   a blocker coupled to the second valve and configured to contact the third valve so that the third valve closes the third aperture to prohibit flow through the third aperture when the second valve closes the vent aperture.

42. The fuel vapor recovery system of claim 41, wherein the blocker extends through the vent aperture and the first aperture into the third chamber and is movable with the second valve.

43. The fuel vapor recovery system of claim 41, wherein the blocker extends through the vent aperture and includes a first end fixed to the second valve and a second end spaced apart from the second valve to contact the third valve in the third chamber.

44. The fuel vapor recovery system of claim 43, wherein the blocker is tapered between the first and second ends of the blocker to adjust the flow through the vent aperture.

45. The fuel vapor recovery system of claim 41, wherein the blocker is positioned to lie in coaxial relation to the second and third valves.

* * * * *